United States Patent [19]
Wang

[11] Patent Number: 5,757,891
[45] Date of Patent: May 26, 1998

[54] EVER READY TELEPHONIC ANSWERING-MACHINE FOR RECEIVING AND DELIVERING ELECTRONIC MESSAGES

[76] Inventor: Kevin Kuan-Pin Wang, 11867 Woodhill Ct., Cupertino, Calif. 95014

[21] Appl. No.: 494,652

[22] Filed: Jun. 26, 1995

[51] Int. Cl.[6] .................................................. H04M 11/00
[52] U.S. Cl. ............................................................. 379/93.24
[58] Field of Search .......................... 379/96–100, 93, 379/142, 67, 88–90, 93.01, 93.17, 93.21, 93.24, 100.01, 100.08; 358/402; 370/61, 428

[56] References Cited

U.S. PATENT DOCUMENTS

| | | | |
|---|---|---|---|
| 4,196,310 | 4/1980 | Forman et al. | |
| 4,451,701 | 5/1984 | Bendig | 379/97 |
| 4,837,797 | 6/1989 | Freeny et al. | 379/96 |
| 4,924,496 | 5/1990 | Figa et al. | 379/142 |
| 5,003,580 | 3/1991 | Duong et al. | 379/96 |
| 5,014,125 | 5/1991 | Pocock et al. | |
| 5,138,653 | 8/1992 | Le Clercq | 379/96 |
| 5,164,982 | 11/1992 | Davis | 379/96 |
| 5,245,651 | 9/1993 | Takashima et al. | 379/100 |
| 5,333,152 | 7/1994 | Wilber | 379/98 |
| 5,379,340 | 1/1995 | Overend et al. | 379/96 |
| 5,406,557 | 4/1995 | Baudoin | |
| 5,467,385 | 11/1995 | Reuben et al. | 379/142 |
| 5,487,100 | 1/1996 | Kane | |

*Primary Examiner*—Wing F. Chan
*Attorney, Agent, or Firm*—Bo-In Lin

[57] ABSTRACT

The present invention discloses a telephonic E-mail 'answering machine' for receiving, processing and storing electronic messages. The E-mail answering machine includes a phone jack for adapting to an existing telephone line for receiving electronic messages from the phone line. The telephonic apparatus further includes a processor for responding to the electronic messages and for storing the messages in the answering machine. In another preferred embodiment, the telephonic E-mail answering machine further includes a LCD display for providing information to a user relating to a reception of the electronic messages.

35 Claims, 14 Drawing Sheets

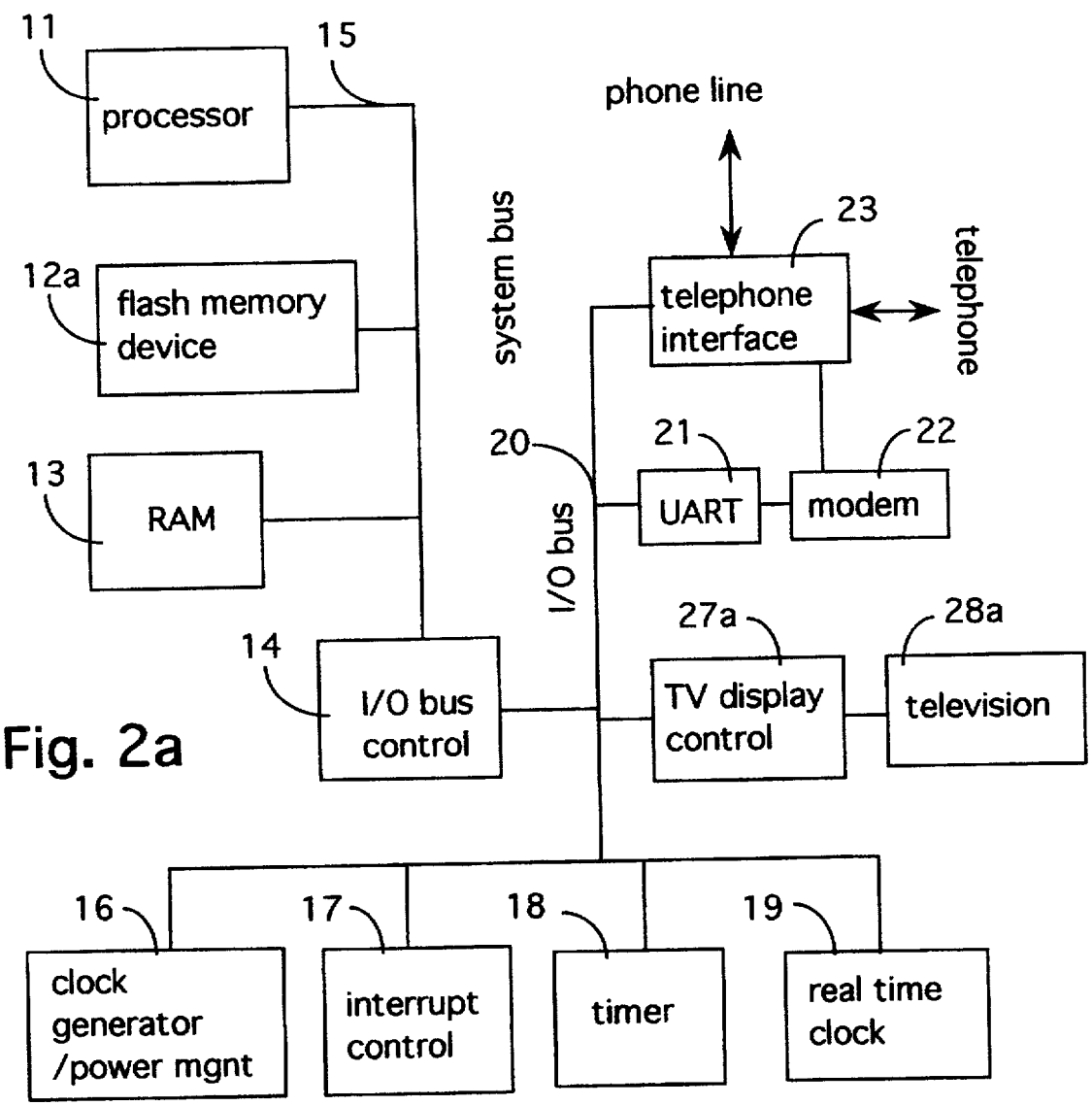

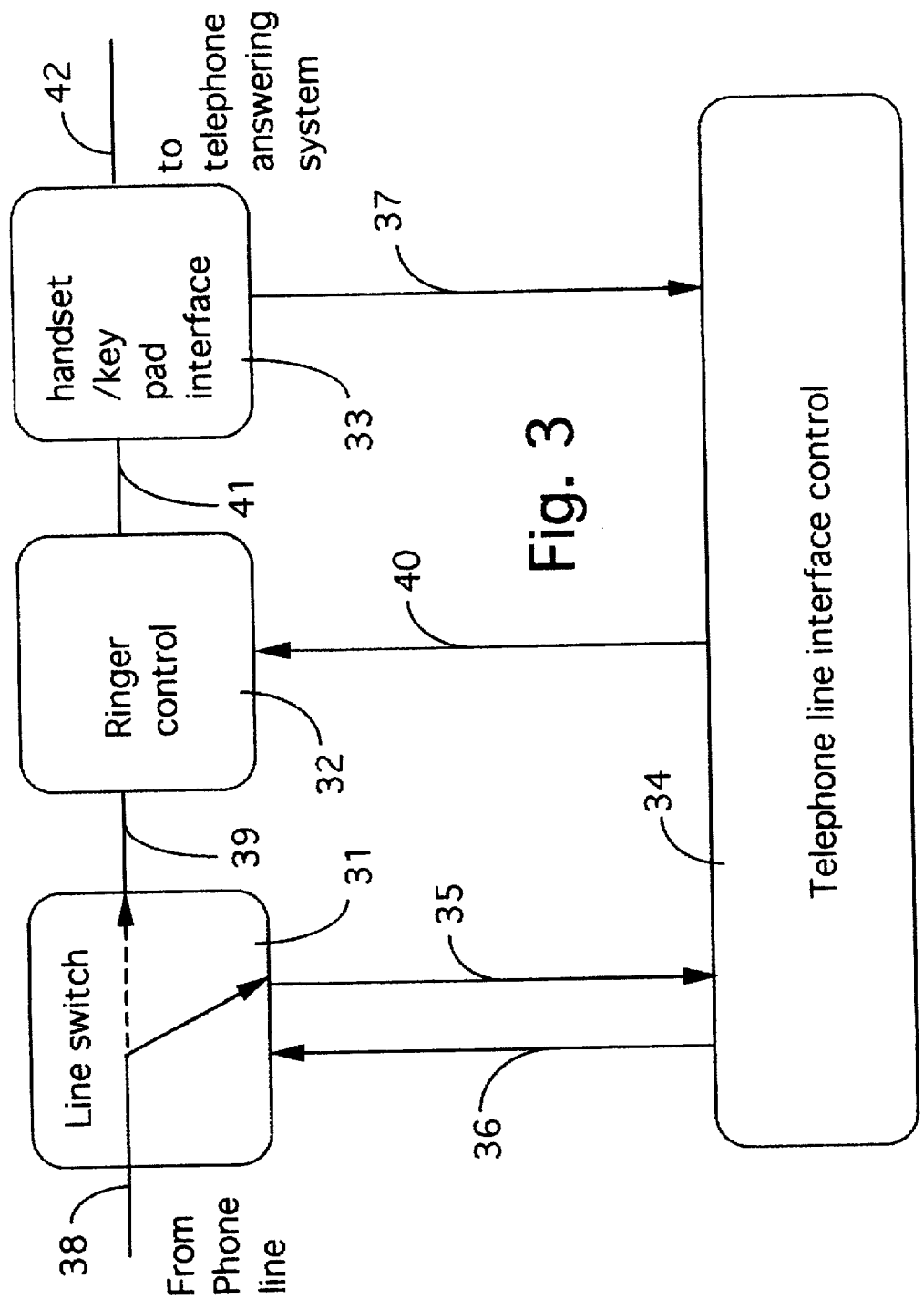

Special functions 1. registration
2. set current time
3. set personal code (p code)
4. change the number to dial
5. Hold mail
6. Forward mail
7. Auto-dial time
8. data import/export
9. display E-mail address
10. change E-mail address
11. Self-test

Fig. 5

EVER READY TELEPHONIC ANSWERING-MACHINE FOR RECEIVING AND DELIVERING ELECTRONIC MESSAGES

BACKGROUND OF THE INVENTION

1. Field of the Invention

This invention relates generally to architecture and method for telephonic message processing. More particularly, this invention relates to a novel electronic message processing apparatus installed in an existing telephone network for performing a signal and data handling process to enable the reception, deliverance and processing of electronic messages, e.g., electronic mails (E-Mails), without requiring any changes to current telephonic functions.

2. Description of the Prior Art

Even with rapid increase in the use of personal computers and computer networks, the benefits of electronic communications in the forms of electronic data (or messages) representing texts, images and sounds are still limited to very small percentage of the population. To the majority of people, the information highway is still too remote. In order to get on the 'ramp' of the information highway, more sophisticate processes are required which may involve the use of computer and modem to 'log on' a local server, setting up an account, executing communications programs, sending and receiving messages, and download and upload files. To people in most households, even with a computer and a modem, these tasks are too complicate and not sufficiently 'user friendly'. Even if the technology and the systems are available, there are still many hurdles to overcome before most people can switch to an E-Mail communication mode. Ordinary people are not yet able to take advantage of the existing telephone systems and micro-processors or computers to routinely communicate with 'electronic mail' (E-Mail) for sending and receiving electronic messages.

The telephone system has been greatly enhanced and become a widely accepted communication apparatus in households and offices since its invention. The examples include the telephone answering system found in households, the voice mail system used in office environments. The telephone answering system, including a tape recorder and some control circuits, provides a very affordable and easy-to-use telephone apparatus. It answers the incoming phone call by taking a series of steps. It performs an off-hook operation to simulate the action of human-being picking up a handset. Then, it starts the communication by making an announcement and takes the message from the caller by recording the message on an audio tape. When it finishes, it hangs up and sets the incoming message indicator, such as blinking a LED. The party being called can look at the indicator and knows immediately how many messages are on the machine. To retrieve the message, all it takes is to push one button. The regular tape recorder functions, such as STOP, PLAY, FAST FORWARD and REWIND, are available to the telephone answering system. The system has been so widely accepted that many manufacturers have integrated the answering/recording functions within a telephone apparatus. The voice mail system takes a step further. It creates individual voice-mail box for everyone on the list. It allows the sharing of one telephone answering system but still keeps the privacy of the individual.

While voice communication through the telephone becomes part of our daily lives, the widely used computer has created another format of communication—data communication. One of them is electronic mail, or E-mail. The electronic mail may contain text, image and digitized voice. It provides a great alternative of communication among people. Through computer network system, one person can send a mail to another person anywhere in the world as long as the addressee has a computer connected to the same network. The increasing popularity of the global computer network, the Internet, has made the E-mail more useful than ever.

These two important ways of communication by the use of telephone and computer networks have worked very well in voice and data communication respectively. More sophisticate computer users are able to use computer with modem to connect with existing telephone networks to manage both data and voice communication. However, since the telephone lines can only be used on a 'dedicated' basis. Voice or data communication is totally blocked for a segment of time when that line is occupied in connecting by modem to computer networks or when two people are talking using the phone. Because of the nature of operation, an electronic message, which has arrived at a server station, has to wait until a user logs on thus much useful time is wasted. This passive nature of E-mail delivery thus generates waste of useful resources and time when the messages are idle waiting to be retrieved.

There are some attempts to integrate a plurality of media communication in office environment. Some representative examples are U.S. Pat. No. 5,333,266, entitled METHOD AND APPARATUS FOR MESSAGE HANDLING IN COMPUTER SYSTEMS, issued to Boaz et al. on Jul. 26, 1994 and U.S. Pat. No. 5,349,636, entitled INTERFACE SYSTEM AND METHOD FOR INTERCONNECTING A VOICE MESSAGE SYSTEM AND AN INTERACTIVE VOICE RESPONSE SYSTEM, issued to Irribarren on Sep. 20, 1994. Both rely on a powerful computer and a local area network to integrate multiple message systems. They were designed for office use not suitable for households or small offices. Another example is U.S. Pat. No. 5,193,110, entitled INTEGRATED SERVICES PLATFORM FOR TELEPHONE COMMUNICATION SYSTEM. It is specifically designed for use in the central office of telephone company or in a large corporate office. These inventions do not provide a solution to the difficulties that higher skill level of computer are required for E-Mail communication. Regular daily use of E-Mail communication in homes, college dormitories and small offices are still not so convenient for most people.

Popular and routine use of E-Mail communications are still hindered by current requirements of equipment and network configurations. First, the E-mail is limited to those who have access to computers or terminal devices connected to a host computer capable of process E-mail. This may not be a problem in modern offices equipped with computers and networks for connecting to host computers or network severs. But it becomes a significant limiting factor for households and offices without the modern equipment or connecting networks. Secondly, the actual reception of the electronic messages can only be performed when the receiving computers, i.e., terminals for communication, are connected to E-mail server. The usefulness of E-mail is greatly limited in terms of timelines of the messages. In order to assure that no important messages are missed, a user has to log on to the network in a routine manner to 'check the mail' regularly. It may becomes burdensome during some inconvenient time. In order to resolve this difficulty, Clercq discloses in a U.S. Pat. No. 5,138,653, entitled SYSTEM FOR AUTOMATIC NOTIFICATION OF THE RECEIPT OF MESSAGES IN AN ELECTRONIC MAIL SYSTEM (issued on Aug. 11, 1992), an E-mail system for making a call to an E-mail addressee which is triggered when a message is received. An addressee is then required to retrieve the E-mail from remote station by the use of a computer. It may even be more inconvenient than a 'beeper' as the addressee may not be in a convenient place with access to a computer and modem to log on to a server.

Therefore, a need still exists in the art of system design and device manufacture for electronic message communication to overcome these bottlenecks and inconveniences which limit the usefulness of the E-mail. Specifically, it is desirable to provide a telephonic E-mail apparatus which provides functions similar to a phone answering machine which is ready for a user for receiving, viewing or listening to the received electronic messages in a 'plug and play' fashion. Additionally, in order to minimize any inconvenience thus caused to a user, it is desirable to adapt the telephonic E-mail apparatus without interfering existing telephonic communication operations. A user would thus be allowed to operate a telephone or phone answering machine with the E-mail apparatus as if no E-mail apparatus had been adapted into the system. An ordinary telephone user would then be provided with a convenient E-mail apparatus ready to be adapted into a telephone system without requiring the use of a computer and applying computer skills whereby the limitations and difficulties of the prior art can be resolved.

SUMMARY OF THE PRESENT INVENTION

It is therefore an object of the present invention to provide an apparatus and a new communication system architect and process ready for implementation on existing telephone system to overcome the aforementioned difficulties encountered in the prior art.

Specifically, it is an object of the present invention to provide an apparatus ready to adapt to an existing telephone system in a 'plug-and-play' manner to receive and delivery electronic messages including text, images, and digitized voice signals whereby every household with a telephone can easily access to and be benefited by electronic messages without requiring more complicate processes of employing computer and modem and managing the execution of communication programs before such messages can be exchanged thereon.

Another object of the present invention is to provide a telephonic electronic message 'answering machine' which is equipped with user friendly features similar to a convention answering machine without interfering with existing telephone functions such that every regular house can apply such an apparatus immediately.

Another object of the present invention is to provide an electronic message apparatus which stores initial registration and subsequent logon information therein to automatically dial up several local servers directly, subject to user selection, to perform the initial registration and subsequent logon functions such that more complex functions of registration and logging on to a server can be managed automatically.

Another object of the present invention is to provide an electronic message apparatus which can coordinate with a server to perform message screening and message prioritizing functions such that a user can pre-arrange to receive or screen types of messages according to the importance of such messages.

Briefly, in a preferred embodiment, the present invention includes a telephonic apparatus for processing electronic messages which includes a means for adapting to an existing telephone line for receiving electronic messages including digitized signals. The telephonic apparatus further includes a processing means for responding to the electronic messages and for storing the messages therein. In another preferred embodiment, the telephonic apparatus further includes an user interface means for providing information to an user relating to a reception of the electronic messages.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIGS. 2a, 2b, 2c, 2d are preferred embodiments of communication systems which incorporate an E-mail apparatus of the present invention.

FIG. 3 is a telephone interface block diagram.

FIG. 5 is an example of more complicated or non-frequently used functions menu of the apparatus.

DETAILED DESCRIPTION OF THE PREFERRED EMBODIMENT

Figure 1:
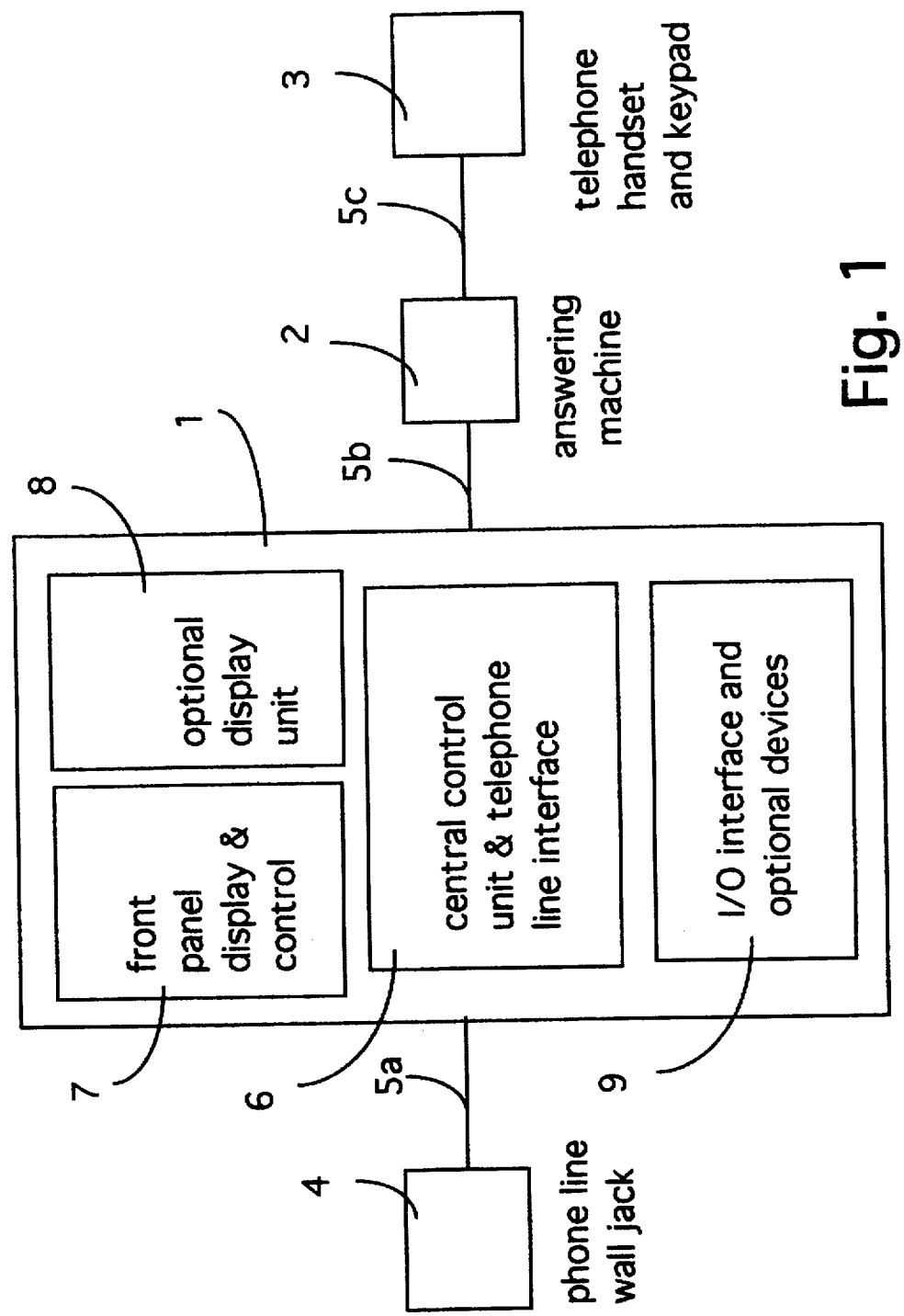
FIG. 1 is a diagram showing how the present invention of the E-mail apparatus connects with the existing telephone answering system.

Referring to FIG. 1, the block diagram shows how the present invention of the E-mail apparatus connects to the telephone and the answering system. A twisted-pair of telephone line 5a connects the phone jack 4 on the wall to the "line" connector on the E-mail apparatus 1. Another telephone wire 6 connects the "phone" connector on apparatus 1 to the answering system 2. Then the answering system 2 connects to the telephone (handset and keypad) through line 5c. If there is no answering machine, line 5b connects to the telephone directly. Every incoming phone call will be taken by the E-mail apparatus first. If it is not for E-mail, it will pass the call to the answering system. It is important to maintain the same functionality of the existing telephone answering system when the apparatus is added to the telephone/answering system. It will be clear when we explain the inside of the apparatus 1. In FIG. 1 it shows that the apparatus has 4 major building blocks: central control & telephone line interface unit 6, front panel display and control 7, optional display unit 8, I/O interface and other devices 9. Only the central control & telephone line interface unit 6 is needed for every apparatus. The others may have many different combinations.

Figure 2:
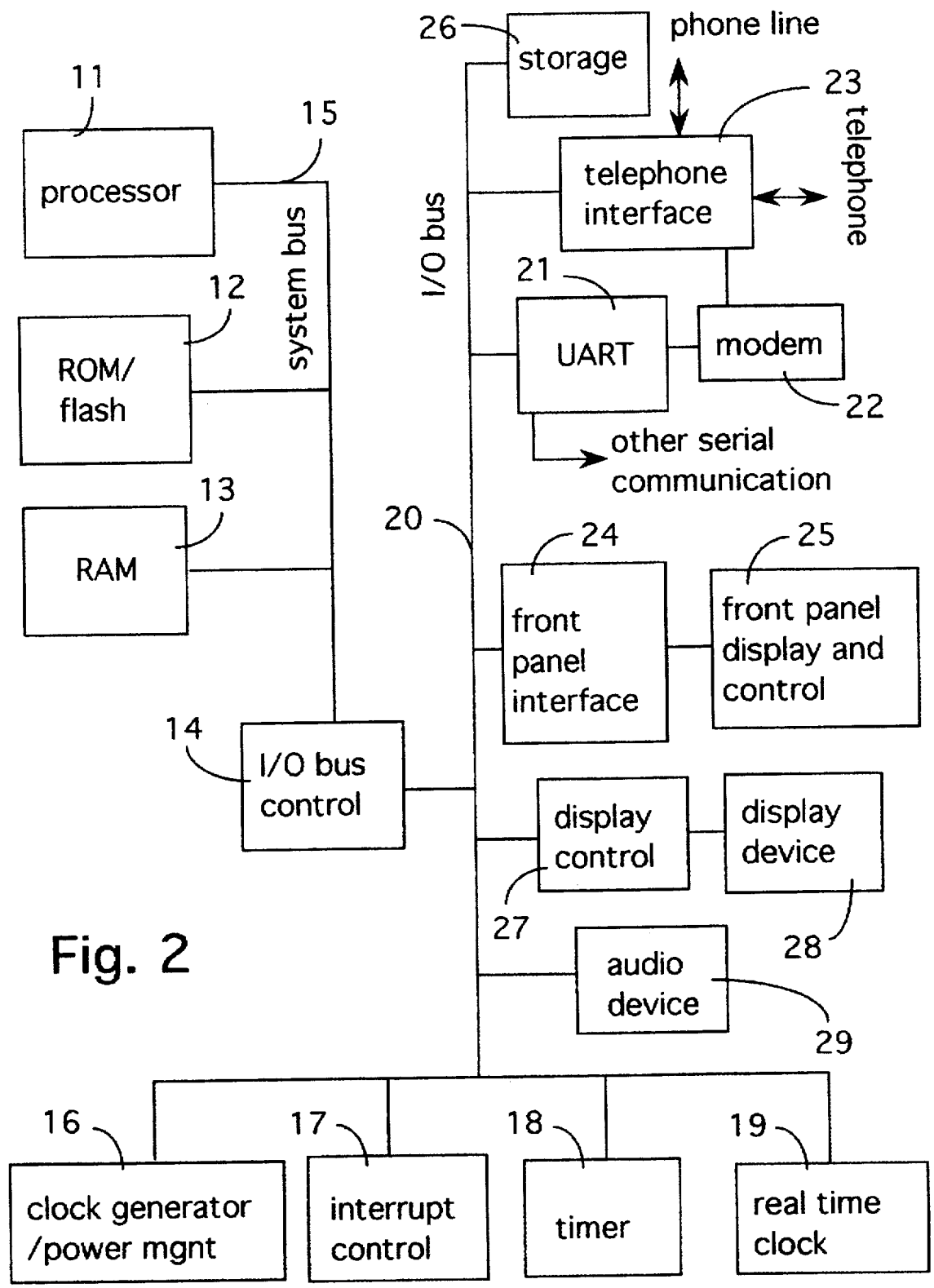
FIG. 2 is a block diagram of the present invention of E-mail capable telephone apparatus.

FIG. 2 is the internal detailed diagram of the E-mail apparatus. Processor 11 reads the codes stored in ROM 12 and performs its duty according to the request from the user. For example, if the auto-collect is set up, processor 11 will receive an interrupt signal from interrupt controller 17. The interrupt will be serviced by processor 11 to set up modem 23 through universal I/O bus 20 and dial the designated E-mail server to collect the E-mail. By using an universal I/O bus 20, it makes the architecture flexible to add or reduce its functions. Block 14 contains logic to interface system bus and I/O bus. Blocks 11–20 constitute the basic central control unit. Blocks 21–23 belong to the telephone interface unit. The basic control and display unit has blocks 25 and 26. Block 28 is the display for mail reading and block 27 is the controller for block 28. There are two displays in FIG. 2. The small display in 26 is used for control and status information. To display mail, a bigger display 28 is more suitable. If display 28 is built-in, display 26 can be eliminated. If the user relies on data export function to move E-mail files to his computer and to read the mail there, display 26 alone will be enough. Display 28 can be a LCD, monitor or a TV, and display control 27 will be a compatible controller. RAM 12 is a device used as a scratch pad for processor during the execution of the codes from ROM 12. ROM 12 can be a flash memory. Processor 11, ROM 12, RAM 13 and I/O bus controller 14 are connected to system bus 15. I/O bus controller allows the processor to communicate with all the other I/O devices. Real time clock 19 keeps track of the time. Timer 18 and interrupt controller 17 are used for program flow control. Clock and power management 16 is used to save the power consumption of the apparatus. When power consumption is not a concern, block 16 can be as simple as a clock chip. Processor 11 responds to the user request from front panel control 26 through panel interface block 25. It also uses panel interface block 25 to display other information to user. UART 22 is a serial communication block, it is used to move data between the E-mail apparatus and the external world. Through the modem and telephone line, it connects the apparatus to other communication devices. With a local RS-232 or infra-red link, it can import/export data to/from a computer, digital organizer or printer. Display control 27 is to display the mail on a display device 28. Some desirable devices such as secondary storage device 21, audio device 29 are optional add-ons. If a reasonable size of flash device is used as storage, block 21 will not be important. Telephone interface block 24 controls the interface with telephone line, telephone answering system and modem. The details of block 14 are shown in the diagram of FIG. 3.

There are many electronics devices available to implement FIG. 2. Here is one example. Use the single chip platform VG-230 from Vadem (San Jose, Calif.) for blocks 11, 15, 16–19, 20, 22, 27 in FIG. 2. This chip has processor, memory controller, I/O bus and many I/O peripheral devices integrated into a single chip. Modem (block 23) can be the single-chip modem SSI 73K321L from Silicon Systems (Tustin, Calif.).

Figure 2B:
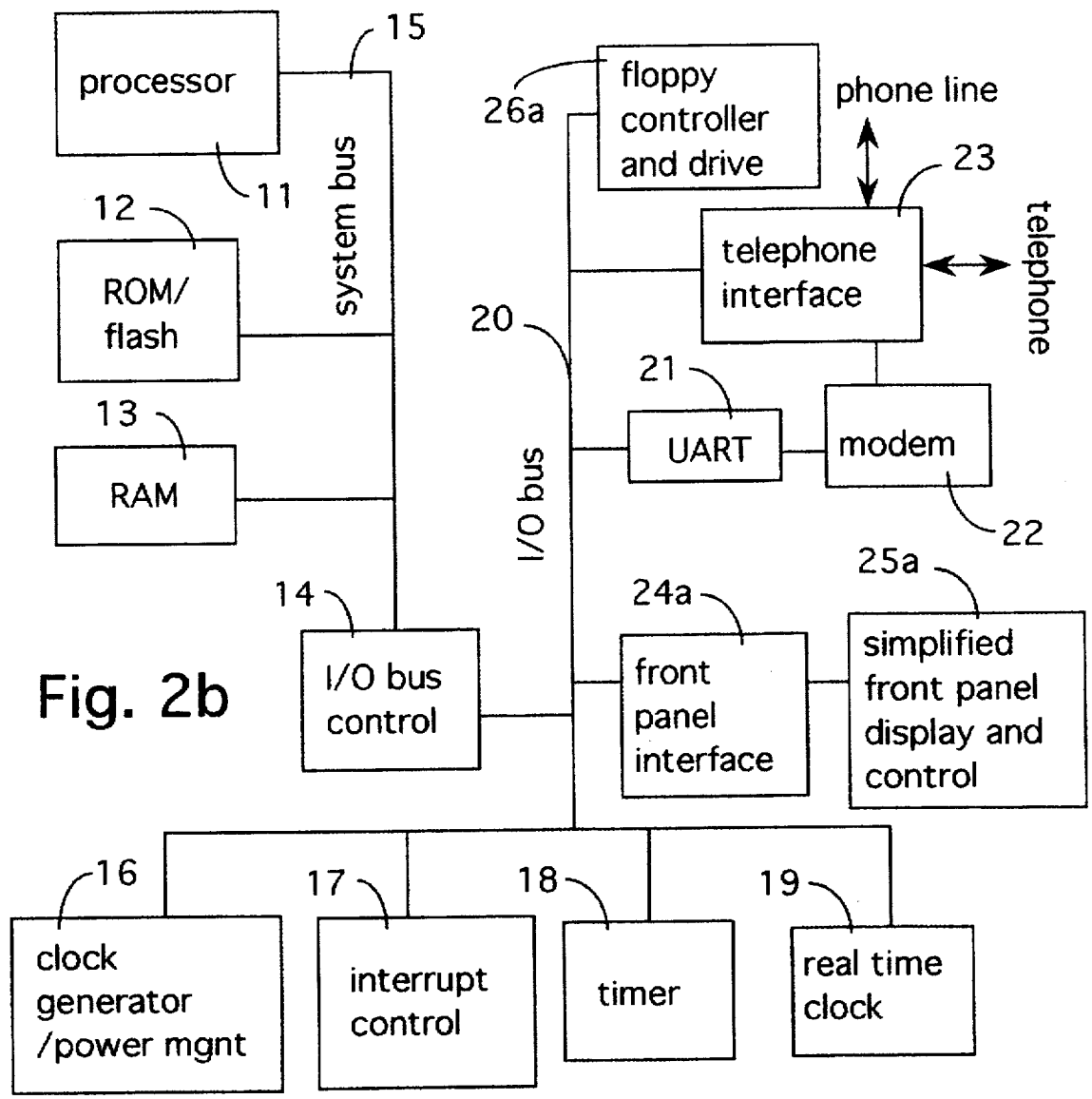
Figure 2C:
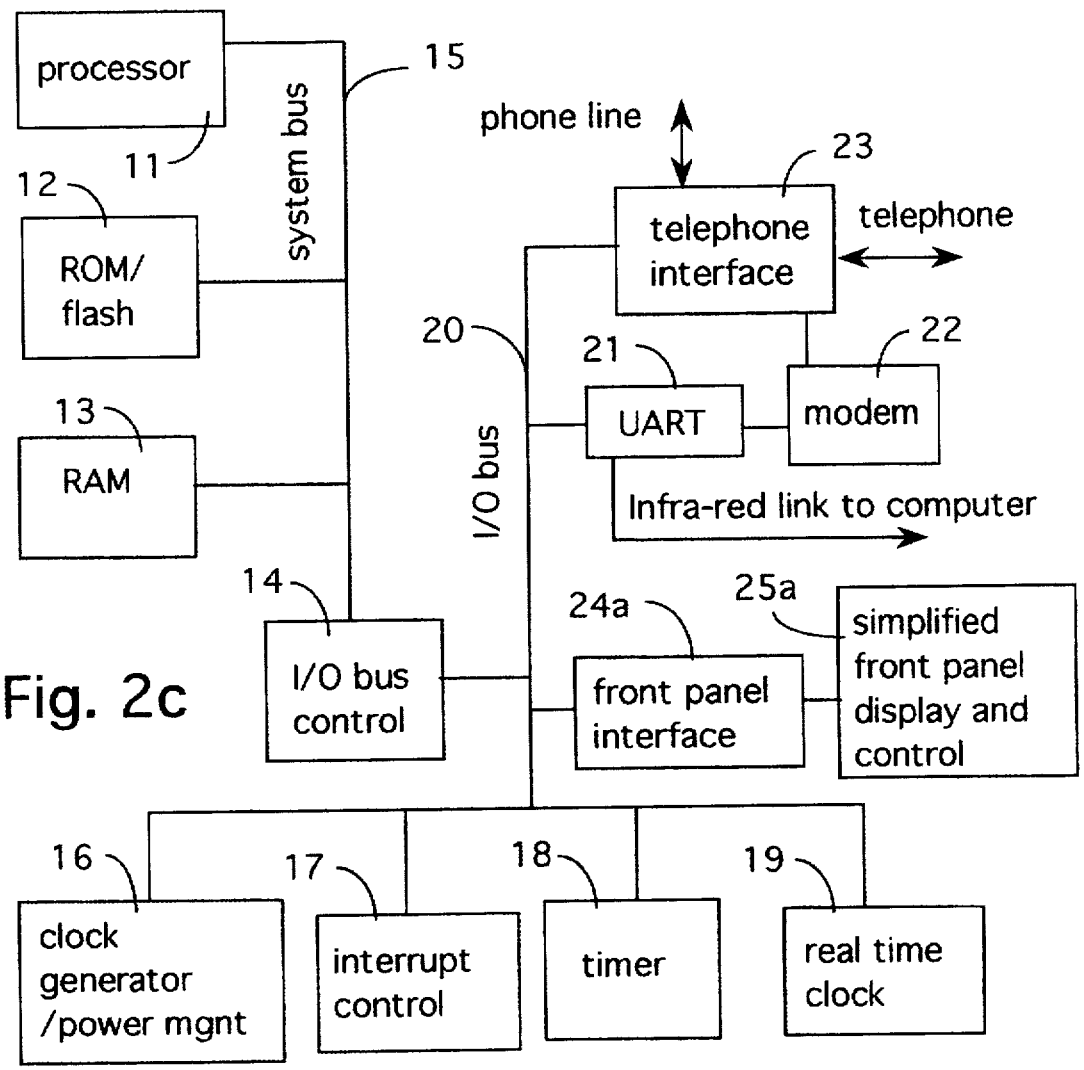
Figure 2D:
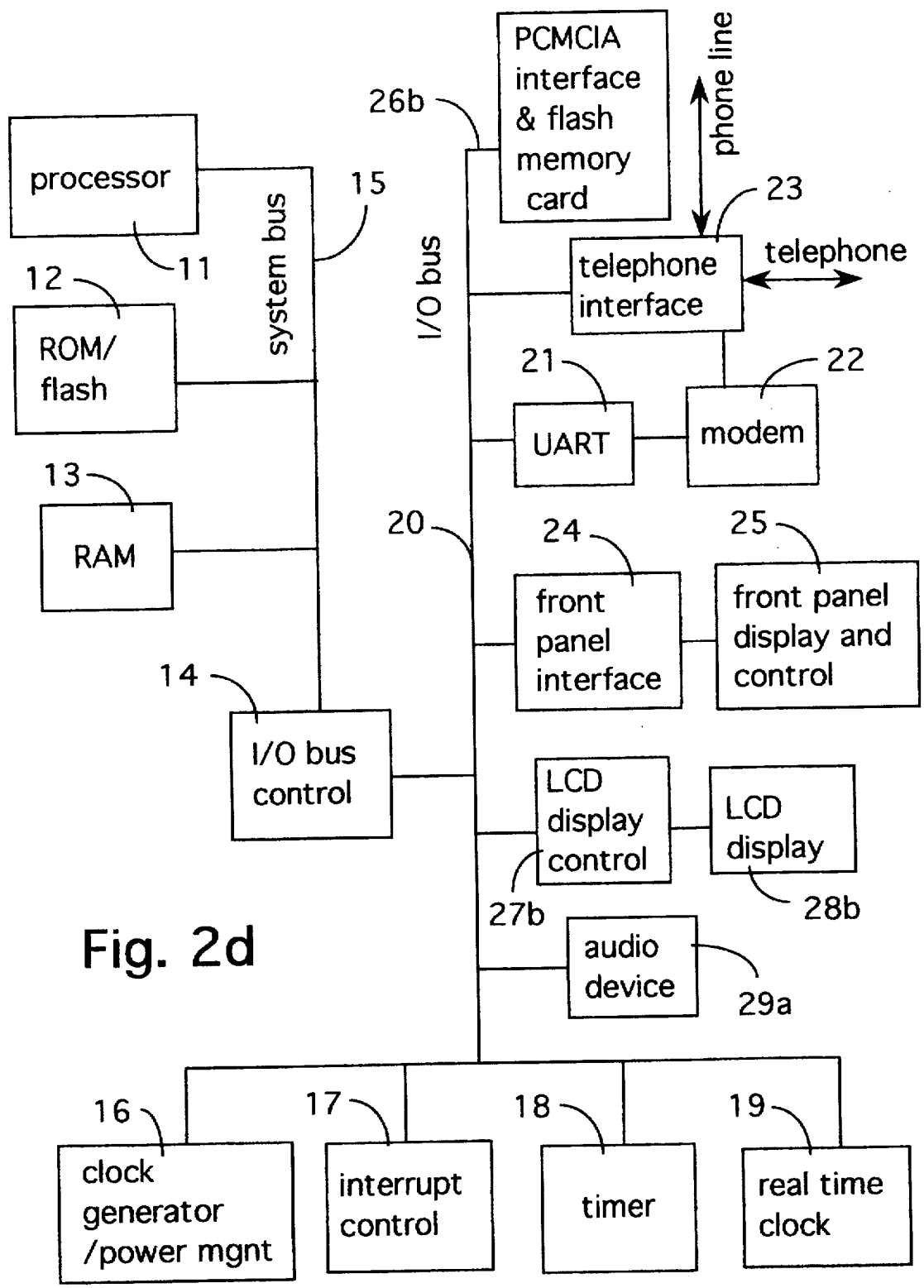

FIGS. 2a–2d are preferred embodiments showing some of the possible combinations of the modules. FIG. 2a uses TV as a primary display of mail. Block 28 in FIG. 2 is replaced with a television 28a. Flash memory 12a is used for codes and mail storage space. This is one of the simple implementations. FIG. 2b is suitable for people who have access to the computer. It is comprised of a floppy controller and drive. The mail is save on a floppy diskette. The user can take diskette to a computer and read mail there. Block 25 can be simplified since there is no need to control the display of mail. This is an example of how to count on data export function to reduce the configuration of the apparatus. FIG. 2c is another example of data export function except using different means of moving data is used. It uses Infra-red link o move data to/from the computer. In both cases, outgoing mail can also be imported from diskette or infra-red link. FIG. 2d is an example with extensive functions. It contains removable flash memory card 26b using industry standard PCMCIA interface to save mail. It has a built-in LCD display 28b for reading mail. An audio device 29a will generate voice if the incoming mail contains a digitized voice file.

FIG. 3 is the diagram showing internal block of the telephone interface function. When the system is in idle state (i.e. no incoming phone call), line switch 31 is set to telephone line 35 and interface control 34 and line 39 is open. When there is an incoming phone call, the telephone line interface control 34 will generate an off-hook to the caller and then monitor line 35 to see if it is an E-mail communication from line 38. If it is not, interface control 34 triggers a ring through the ring control 32 and lines 40, 41 and 42 to the telephone answering system. When handset/keypad interface block 33 detects off-hook signals on line 37 from the telephone answering system, line switch 31 turns the switch to line 39. Then the telephone is in control. The E-mail apparatus gives up communication to the telephone/answering system. This is a very important process for maintaining the function of telephone answering system function as if the E-mail apparatus is absent. In the case of E-mail communication, line switch 31 keeps the phone line connected to 35 all the time. Handset and keypad interface block 33 also becomes active when the keypad is used to control the E-mail apparatus or to edit an outgoing mail. The keypad information will be passed to the processor to respond.

Figure 4:
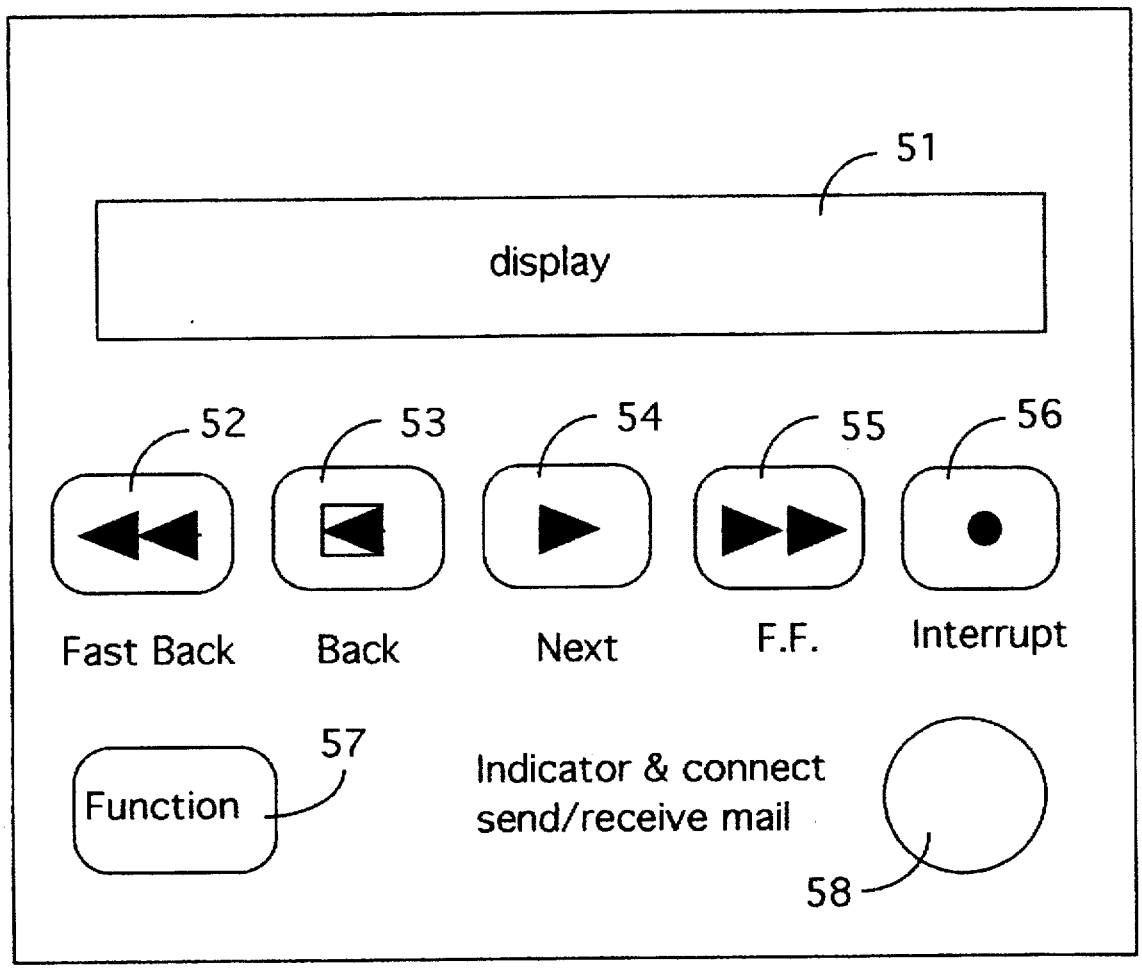
FIG. 4 is an implementation example of a basic front control panel of the apparatus.

FIG. 4 is an example to show the concept of the easy-to-use interface. Block 51 is a simple display panel. Blocks 52–57 are control buttons. Button 58 is a control button and an indicator. A blinking indicator 58 means an incoming mail is ready for retrieval. The user can push button 54 to read the mail. At every push of button 54, a full page of mail would be displayed to fit into the size of the display. Push button 55 to jump to the next mail. Button 53 is to display the previous page. Pushing button 52 to jump to the beginning of the previous mail. Pushing button 52 longer means back to the beginning of the first mail and the mail will be overwritten when the next batch of mail arrives. Pushing button 58 will dial, send and collect mail. When it is done, a message will be displayed on block 1 and call indicator 8 will be blinking. Button 56 is used to interrupt the E-mail communication when the user needs to use the telephone. Button 57 is a special function button. It provides more complicated or unusual functions. It brings a menu of functions for the user to select. The functions may include registration, mail forward, and mail hold request. The list in FIG. 5 is an example for those functions. The concept of separating all the basic and frequently-used functions from the complicated and infrequently-used functions by different interfaces makes the E-mail apparatus a user-friendly device while maintaining some advanced functions.

FIG. 5 exemplifies a list of the menu of more complicated and infrequently-used functions. Function 1 is a guided registration process function. Function 2 is to set the current time. Function 3 is to set the programmable secret code. Function 4 is to change the number to dial other than the designated E-mail server. Function 5 is to request E-mail server to hold the mail. Function 6 is to request the forwarding of the mail. Function 7 is to set up the daily auto-dial and connect time with the E-mail server. Function 8 is for data import/export. Function 9 is to display your e-mail address. Function 10 is to request the change of E-mail address if you don't like the assigned address after registration. Function 11 is to run diagnostics on the unit. By pushing button 57 in FIG. 5, the menu of functions will be on the display 51 in FIG. 4. Every push will display next function. Button 58 is used to select the function. When the function is selected, the software in apparatus will guide user through the process. If the unit has a bigger LCD display built-in, it may display all the function at once, and the user can move the courser around the menu to select the function.

Whenever the apparatus does not detect any action from the user for an extended period of time, such as 10 minutes, it aborts all the incomplete process and resets to the idle state.

Therefore, the present invention discloses a telephonic apparatus for processing electronic messages which includes a means for adapting to an existing telephone line for receiving electronic messages. The telephonic apparatus further includes a processing means for responding to the electronic messages and for storing the messages therein. In another preferred embodiment, the telephonic apparatus further includes an user interface means for providing information to an user relating to a reception of the electronic messages.

Figure 6:
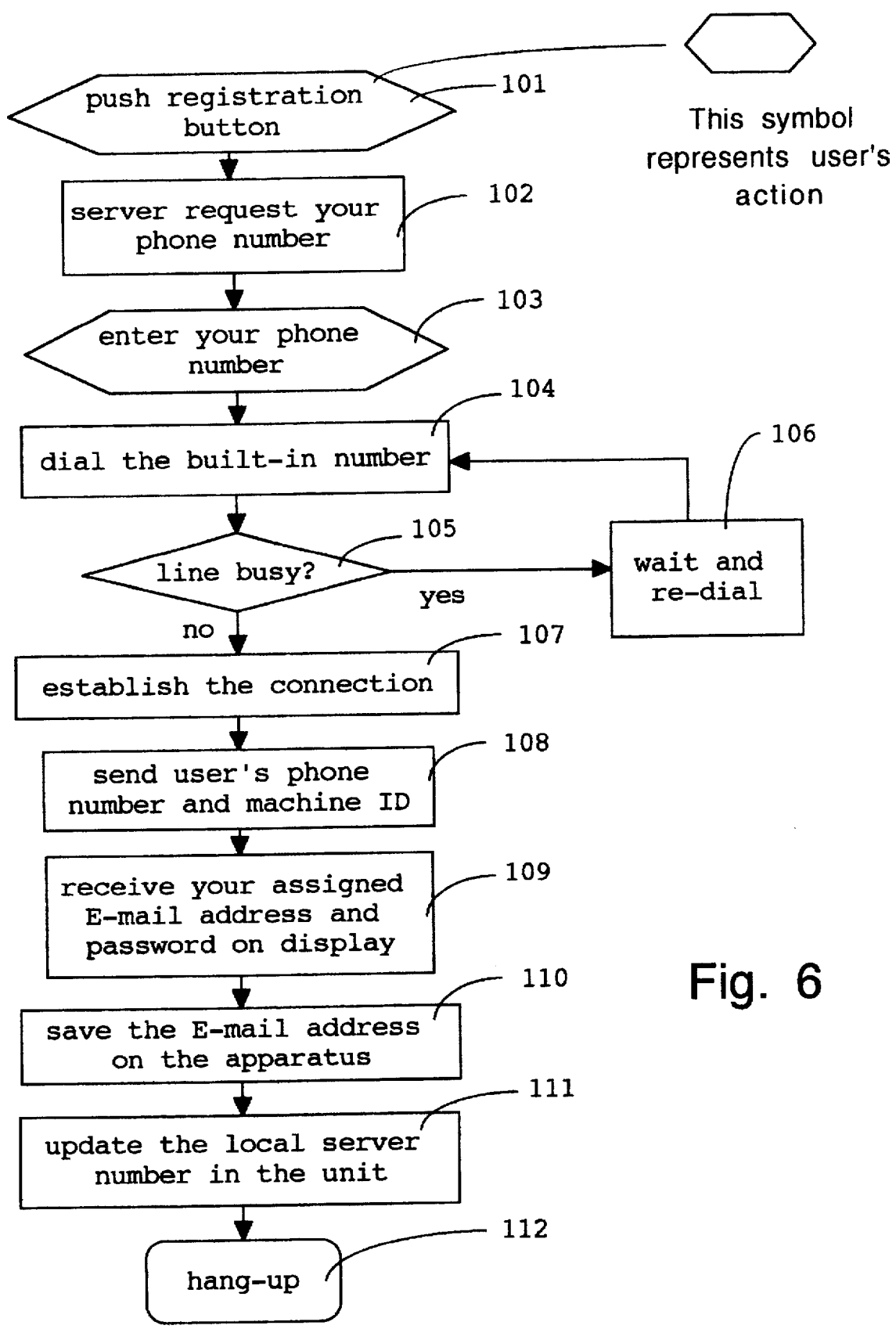
FIG. 6 is a flow diagram of the easy registration process.

FIG. 6 is the flow chart of a typical registration process. The user only needs to push a few buttons (step 101 in the diagram) and enter the phone number (step 103). The process will automatically take place by doing steps 104-111 and an E-mail address will be assigned and displayed (step 108). Step 111 is to search the phone number of the best E-mail server for the user to dial in based on user's phone number and save the number in the apparatus.

There are two ways to communicate between an E-mail apparatus and its server. One way is auto-connect, the other is the conventional logon process. When the E-mail apparatus initiates a call to the server, the server will try to auto-connect first. It is an automatic process and requires no user attendance. The first requirement for the auto-connect is that the server knows the user's E-mail address and the machine ID of the E-mail apparatus. The second requirement is that the server and the E-mail apparatus have the same derived password. The derived password is a code generated by an equation based on the P code (programmable code), the user's phone number and the machine ID. In order to do transaction, both need to share the same equation. Checking the machine ID and the derived password, the server can determine the legitimacy of the request from the E-mail apparatus. The auto-connect provides the convenience of automatic downloading mail. But if the checking fails, the server will ask the user to enter the password. This is the case when a different machine is used to download mail, the E-mail apparatus has a different machine ID. The server will not use auto-connect, and a conventional logon process is required to access for security reasons.

In the case of a server initiating the call to an E-mail apparatus, the auto-connect is the only way to communicate and get/give access. In other words, only the designated server can deliver mail to the designated E-mail apparatus. This is to provide security and convenience. If the user gets a new E-mail apparatus, a change of registration is required to get the auto-connect function.

The following is a detailed process of the access legitimacy checking in the auto-connect mode. First, the apparatus sends its unique serial number (i.e. machine ID) to the E-mail sever. Secondly, the apparatus sends its E-mail address to the server. If these two do not match, the server will ask the user to enter the password and the conventional logon process takes place. Otherwise, the E-mail apparatus will proceed to send its programmable code or P code and the derived password to the server. The derived password is generated from the machine ID, P code and user's phone number. It is sent to the server and compared against the derived password from the server. If the server checks and finds it correct, the access is authorized. The programmable code or P code to the E-mail sever is used as an instruction to screen the incoming mail and to generate a derived password.

Figure 7:
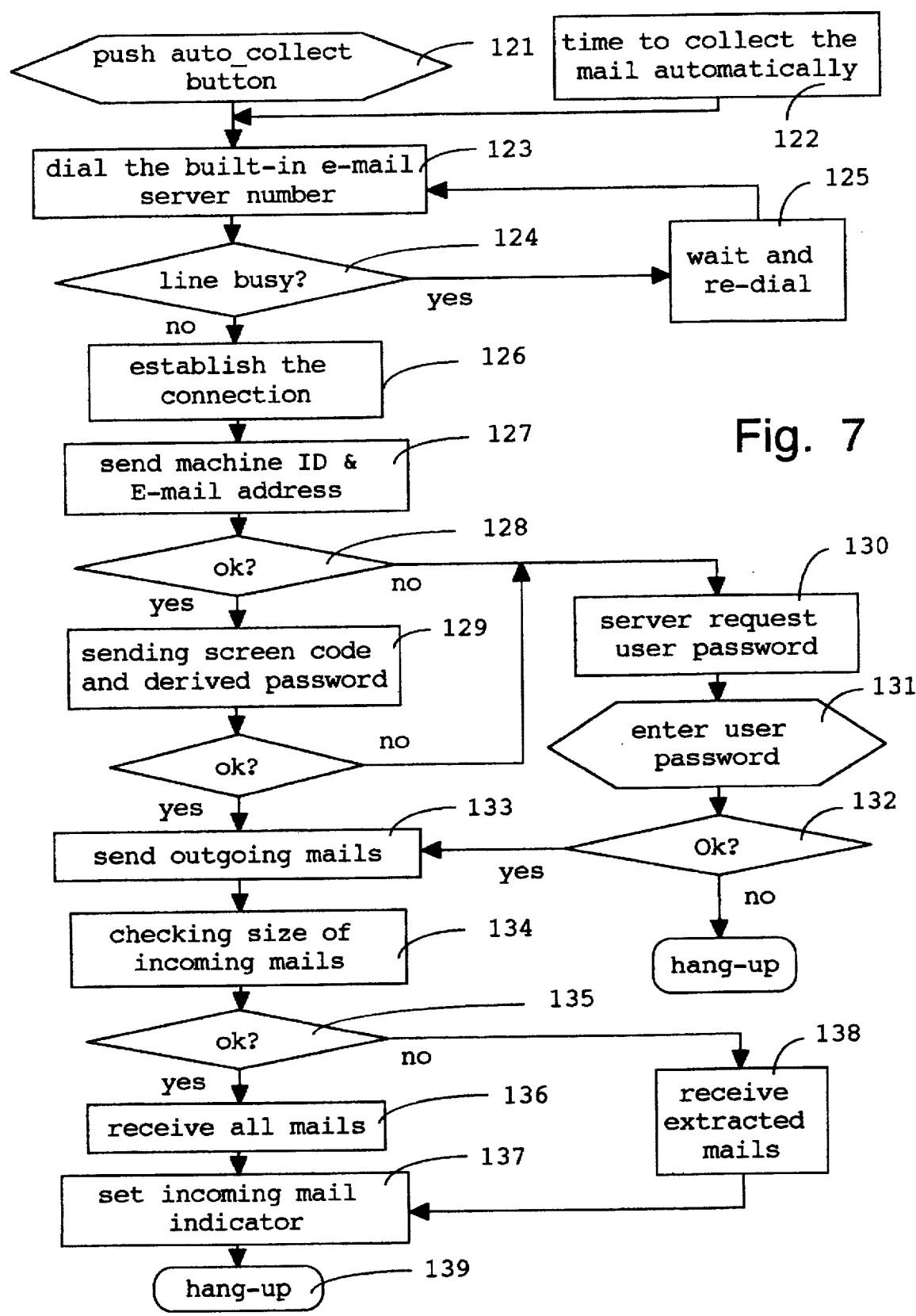
FIG. 7 is a flow diagram of a typical E-mail collecting process.

FIG. 7 is the flow diagram to show how the apparatus connects to the E-mail server, sends the outgoing mail and receives the incoming mail. It can be performed on a predetermined time daily (which starts from step 122 in the diagram) or upon the request from the user (which starts from step 121 in the diagram). Steps 127, 129 and 130 are where security and screening processes take place. Steps 134-138 are designed to prevent the overflow of incoming mail and protect the integrity of the received mail. The details are explained later.

Figure 8:
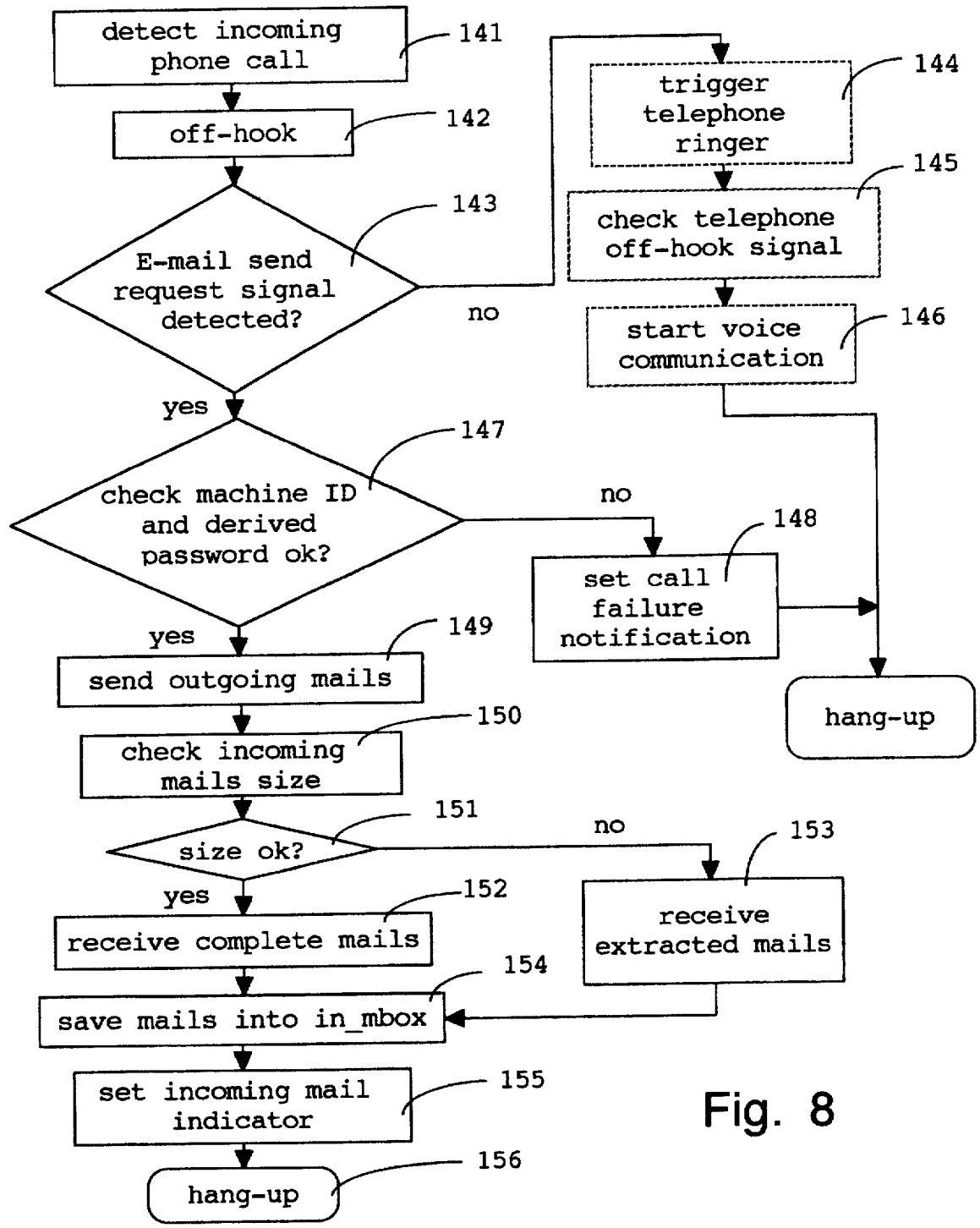
FIG. 8 is a flow diagram of an E-mail receiving process.

FIG. 8 is the flow diagram of how an E-mail apparatus responds to a request from the server. Whenever there is an incoming call, the apparatus will do "off-hook" (step 142) and check if it is an E-mail request (step 143). If it is not, the call will be directed to regular voice communication as steps 144-146. Otherwise, it proceeds to step 147. If the machine ID and derived password checking passes, the transaction starts. If it fails, the call is terminated. Step 148 is an option. It will inform the addressee of a potential problem on the mail delivery. The mail transfer transaction can process the outgoing mail (step 149) and check if the total mail size fits into the E-mail apparatus. If not, only parts (extracted) of the mail are delivered (step 153). Before terminating the process, the incoming mail indicator is updated (step 155).

The following is the detailed description on how the E-mail server screens the incoming mail. It includes sorting, extracting and repackaging before the delivery of the mail.

The present invention uses the extension of the E-mail address and the programmable codes or P code received from the apparatus to determine the importance of the incoming mail. The E-mail address is based on the naming convention on the Internet, called Domain Name System (DNS), with additional field. The DNS has the general format as:

<someone>@[subdomain].[subdomain]. [ . . . ].<domain> where the < . . . > represents required elements and [ . . . ] is optional portion. A typical example looks like: jsmith@sales.abc.com for John Smith in the sales department of ABC corporation. "jsmith" is the account name for John Smith. It is assigned to him by the system administrator of the host computer. Usually, it is the logon name used to access the host computer. And abc.com is the name of the host computer connected to the Internet network. There is governing body for the host name assignment. The name will be translated into IP address and recognized by the peer on the network. Hence a mail from bigbird@xyz.com can be delivered to abc.com host computer through the global network, internet. When the host computer named abc.com receives the mail, it knows its subdomain, sales. It sends the mail to the internal E-mail server in sales department of ABC corporation. When John Smith logons the computer, he will be notified of the arrival of the E-mail.

The present invention uses some extensions on top of the DNS to provide some enhancements. The new extended E-mail address for jsmith@sales.abc.com become jsmith[.<specialcodes>]@sales.abc.com. The general format becomes:

<<someone>.[specialcodes][ClassOfMail]@[subdomain].[ ... ].<domain>

One example looks like: jsmith.4567ER@sales.abc.com. Here "4567" is used to compare with the P code on the apparatus. The result of the comparison determines the importance of the incoming mail. An incoming mail with special codes completely matching the P code will get the highest priority. A mail with partially matched codes will gain some attention based on how close the address extension codes compare with the security code. In the above examples, "E" indicates the mail is Express mail, so it will be delivered in a more timely fashion. The "R" indicates the mail is registered. It requires a return receipt when the mail is delivered successfully. A mail without the special codes on the E-mail address will be treated by the E-mail server as a regular bulk mail.

Since the E-mail ready telephone apparatus is likely to be a small special-purpose device, the relatively limited capacity requires more careful management. The P code provides a very simple way to sort the incoming mail and prevent the flooding of the junk mail. But, even with the screening feature, the unexpected volume of incoming mail may still cause mail box overflow. The mail repackaging function on the server will prevent this from happening. It works as follows.

After the legitimacy checking, the E-mail server gets the information of available storage on the E-mail apparatus and decides what to send. If the total size of the incoming mail exceeds the available storage space on the apparatus, the E-mail server extracts the incoming mail and "repackages" the E-mail and sends it to the apparatus. The extracting process may reduce the mail size by taking the whole content of high priority mail but only the subject, name of sender from the lower priority mail. It may use a complicated method to achieve the best result from extracted mail. The protocol puts the intelligence and complexity to the E-mail server but keeps the E-mail apparatus simple. It is an important concept in the present invention.

Figure 9:
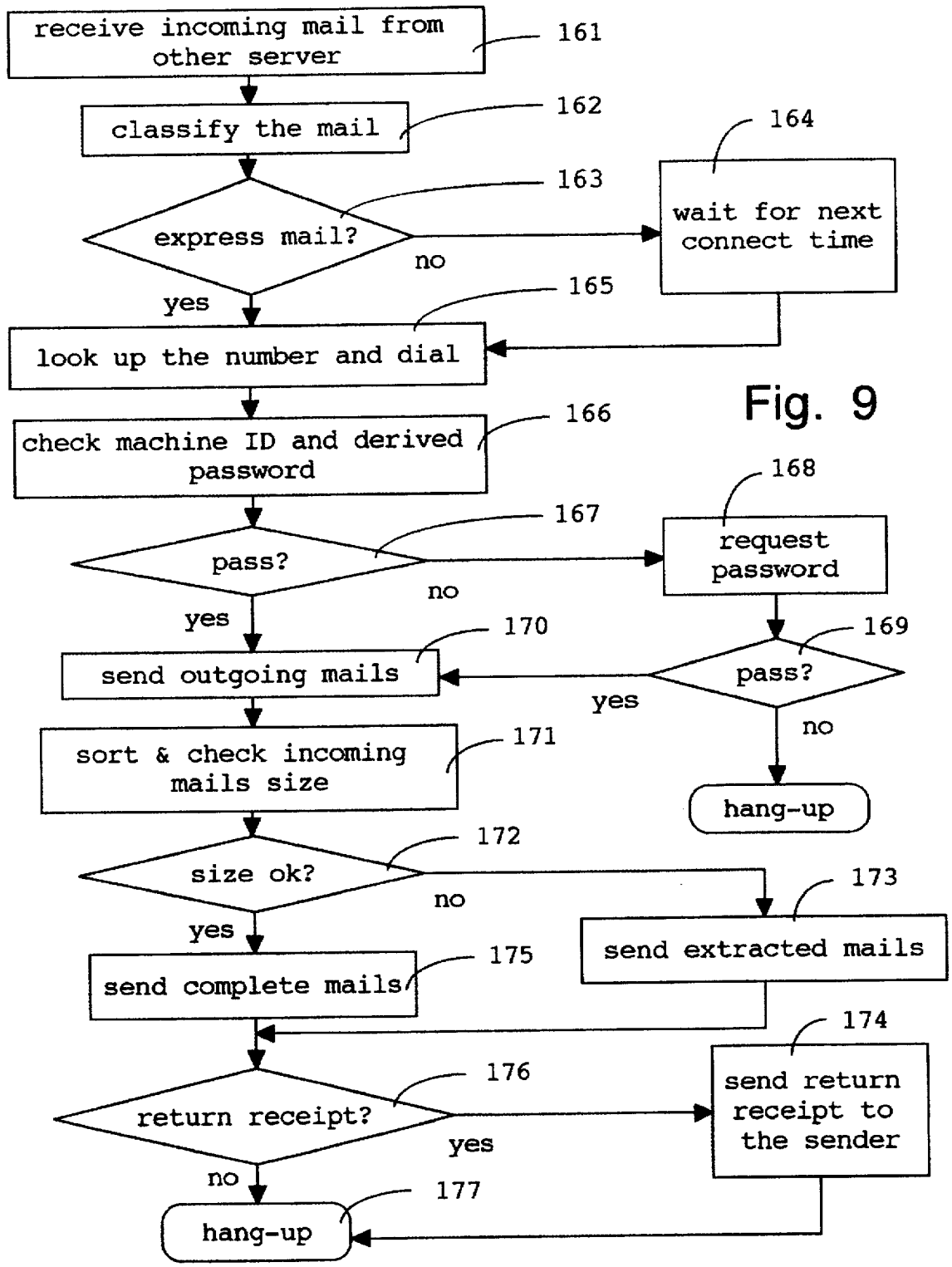
FIG. 9 is a flow diagram of the E-mail delivery process on the E-mail sever.

FIG. 9 is the flow diagram of how an E-mail server processes the mail. Step 166 actually is a two-step process as explained before in FIG. 7. Step 170 sending the outgoing mail and steps 171–172 checking and sorting incoming mail can be done in parallel. Different class of mail may take different steps as shown in step 163 (for express mail) and step 176 (registered mail). This flow diagram exemplifies how a mail is processed.

Figure 10:
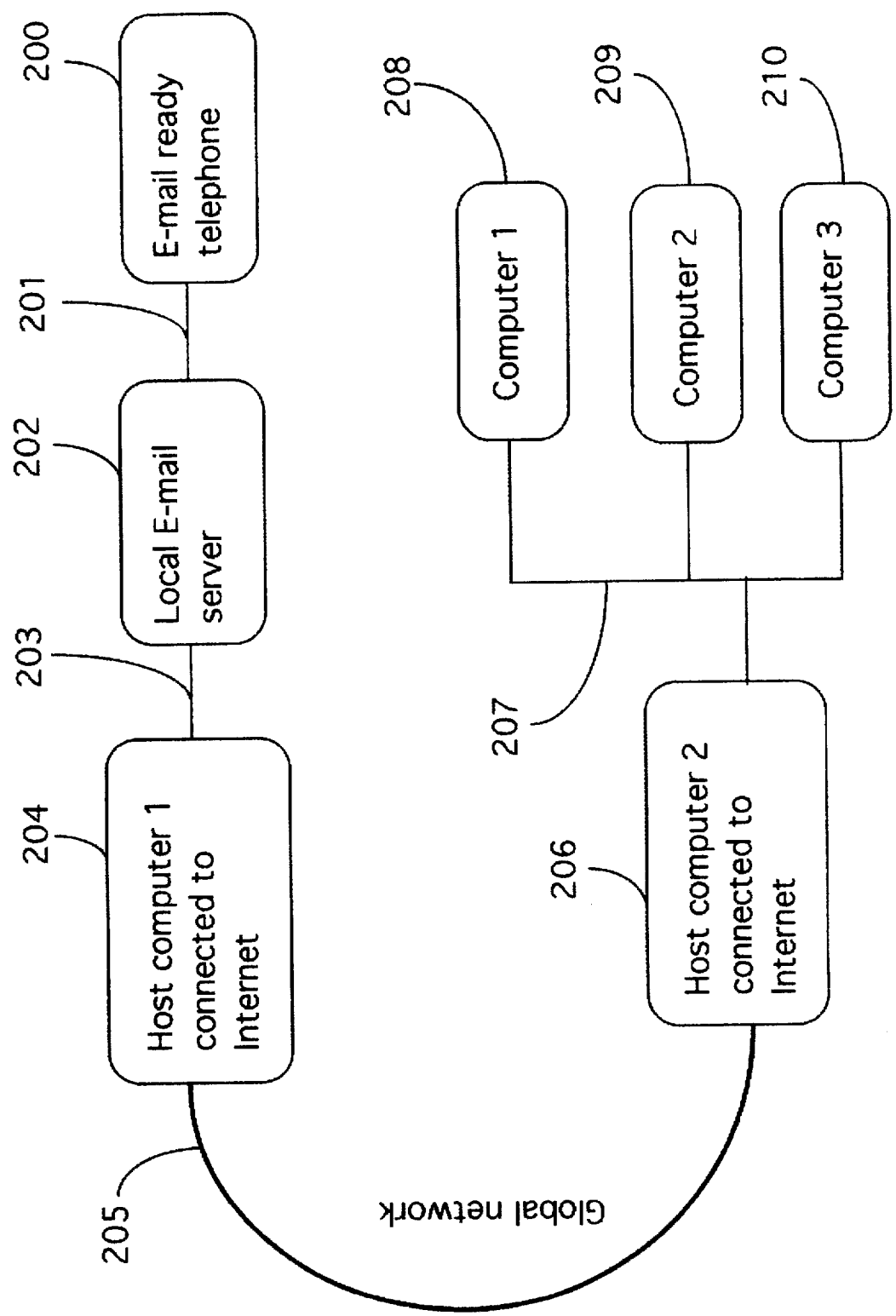
FIG. 10 is the overall network connection diagram. It shows how the E-mail ready telephone communicates with the server and the rest of the world.

FIG. 10 exemplifies the overall network connection. The E-mail ready telephone 200 connects to its local E-mail server 202 through the existing telephone network 201. Usually, the local E-mail server 202 connects to the host computer 204 with a LAN (local area network) 203. A global network 205 links the host computer 204 and 206 together. The network 205 usually is a WAN (wide-area network). Computers 208, 209, 210 and the host computer 206 are connected by a LAN 207. A user can send an E-mail from computer 208 to an addressee of the E-mail ready telephone system 200. The E-mail will travel to the host computer 206 through the LAN 207. The host computer 206 serves as a gateway to the global network 205. The mail will be passed to the WAN 205. It may travel through several host computers before reaching the host computer 204 which has the correct domain name of the E-mail address. Then the host computer 204 will look at the E-mail address or the sub-domain name and send the mail to Local server 202 through Local server 203. The mail will stay in the server and the process of FIG. 9 takes place. The server will deliver the mail either by dialing the addressee's phone number or by just waiting for the request from E-mail ready telephone. Those are the process flows in FIGS. 7 and 8. All the communication process, including legitimacy checking, mail size checking and mail transfer, taken place between the server and the E-mail ready apparatus are through the telephone network 201. When the E-mail apparatus initiates the connection, as described in the process flow of FIG. 7, the server will check if it is the right machine before giving the mail. If the machine ID checking fails, the user has to enter the password to gain access. If the server initiates the call to the E-mail apparatus and finds the incorrect machine ID, mail won't be delivered. But the E-mail apparatus will signifies the addressee of the failed attempt. In any case, the server has to request the information of the available storage space on the E-mail apparatus before sending the mail. It may be necessary for the server to determine the priority of the mail based on the p code and extract partial information for delivery. In other words, it is server's responsibility to deliver the proper size of mail to the apparatus.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A telephonic apparatus provided for processing electronic messages sent from a computer or a network server comprising:

an address checking means for comparing a network-destination-address included in said electronic messages with a network-registered self-address stored in said telephonic apparatus to determine if said network destination address in said electronic messages matches said network-registered self-address;

a means for adapting to an existing telephone line for receiving said electronic messages from said computer or said network server when said network destination address in said electronic messages matches said network-registered self-address;

a processing means for receiving and storing said electronic messages whereby said telephonic apparatus is continuously available and ready to receive said electronic messages without needing a computer for connecting to another computer or logging on to said network server; and a collecting-message triggering means for triggering a connection of said telephonic apparatus to said network server for collecting said electronic messages designated with said network-registered self-address from said network server.

2. The telephonic apparatus of claim 1 further comprising:

a user interface means for providing information to a user for indicating a reception of said electronic messages received from a network computer or said network server.

3. The telephonic apparatus of claim 2 wherein:

said user interface means further includes a display means for displaying a message relating to the reception of said electronic messages.

4. The telephonic apparatus of claim 3 wherein:
said user interface means further includes a display control means which includes control buttons for controlling the display of different electronic messages.

5. The telephonic apparatus of claim 2 further comprising:
a telephone adapting means for connecting to a telephone which being connected to said existing telephone line;
said processing means further includes a telephone interface means for detecting an incoming signal received from said telephone line and for determining if said incoming signal being an electronic message and for transmitting said incoming signal to said telephone when said incoming signal being detected is determined not an electronic message whereby said telephonic apparatus functions similar to a phone-answering machine for receiving and storing said electronic message without needing a user's presence.

6. The telephonic apparatus of claim 5 further comprising:
an electronic message exporting means for delivering said electronic messages via a transmitting means to a receiving device.

7. The telephonic apparatus of claim 6 wherein:
said electronic message exporting means includes a user message control means for controlling a sequence to display said electronic messages.

8. The telephonic apparatus of claim 7 wherein:
said user interface means further includes a message exporting interface means for providing an interface for exporting said electronic message.

9. The telephonic apparatus of claim 5 further comprising:
an automatic registration means for storing required registration data includes said registered self-network address therein and for automatically dialing and registrating with said network server for receiving said electronic messages therefrom.

10. The telephonic apparatus of claim 5 further comprising:
a removable data storage means for storing said electronic messages therein for removably transferring said electronic messages therefrom.

11. The telephonic apparatus of claim 5 further comprising:
an automatic logon means for automatically dialing and logging on said network server periodically with said registered self network address for receiving said electronic messages therefrom.

12. The telephonic apparatus of claim 5 further comprising:
a message screen means for detecting designated message identifications in said electronic messages for receiving and storing said electronic messages with said designated message identifications.

13. The telephonic apparatus of claim 2 wherein:
said processing means further includes a message sending means for sending said electronic messages therefrom.

14. The telephonic apparatus of claim 13 wherein:
said collecting-message triggering means further includes a storage capacity process means for sending a storage capacity of said telephonic apparatus to said network server in triggering said connection thereto whereby said network server is provided with said storage capacity to prevent a message overflow to said telephonic apparatus.

15. A telephonic apparatus provided for processing electronic messages sent from a computer or a network server comprising:

an address checking means for comparing a network-address included in said electronic messages with a network-registered self-address to determine if said network address in said electronic messages matches said network-registered self-address;

a means for adapting to an existing telephone line for receiving said electronic messages includes digitized signals therefrom;

a means for adapting to an existing telephone line for receiving said electronic messages with digitized signals from said computer or said network server when said network address in said electronic messages matches said network-registered self-address;

a processing means for responding to said electronic messages wherein said processing means further includes a message storage means for storing said electronic messages therein;

a user interface means includes a display means for displaying information to a user relating to a reception of said electronic messages, said user interface control means further includes a display control means which includes control buttons for controlling the display of different electronic messages;

a telephone adapting means for connecting to a telephone which being connected to said existing telephone line;

said processing means further includes a telephone interface means for detecting an incoming signal received from said telephone line and for determining if said incoming signal being an electronic message and for transmitting said incoming signal to said telephone when said incoming signal being detected is determined not an electronic message;

an electronic message exporting means for delivering said electronic messages via a transmitting means to a receiving device wherein said electronic message exporting means includes a user message control means for controlling a sequence to display said electronic messages;

said user interface means further includes a message exporting interface means for providing an interface for exporting said electronic messages;

an automatic registration means for storing required registration data therein and for automatically dialing and registrating with said network server for receiving said electronic messages therefrom;

a storage capacity processing means for checking a storage capacity of said telephonic electronic message apparatus and for sending a storage capacity message to said network server whereby a message overflow of said telephonic electronic message apparatus may be prevented; and a collecting-message triggering means for triggering a connection of said telephonic apparatus to said network server for collecting said electronic messages designated with said network-registered self-address from said network server.

16. The telephonic apparatus of claim 15 further comprising:
a message screen means for detecting a programmable code in said electronic messages for receiving and storing said electronic messages with said programmable code wherein said programmable code in said electronic messages is employed for arranging a priority for receiving and storing said electronic messages.

17. The telephonic apparatus of claim 16 further comprising:

a removable data storage means for storing said electronic messages therein for removably transferring said electronic messages therefrom.

18. The telephonic apparatus of claim 15 further comprising:
an automatic logon means for automatically dialing and logging on a network server periodically using said network-registered self-address for receiving said electronic messages therefrom.

19. The telephonic apparatus of claim 15 wherein:
said telephonic apparatus being provided for receiving a plurality of message units; and
said user interface means includes a message unit access control means for controlling an access to each of said plurality of message units.

20. The telephonic apparatus of claim 15 wherein:
said processing means further includes a message sending means for sending said electronic messages therefrom.

21. A method for providing communication between a network electronic message server and a telephone user connected with telephone line to the server comprising the steps of:
(a) providing a telephonic electronic message apparatus includes a means for adapting to said telephone line for receiving electronic messages from said server and comparing a network address contained in said electronic messages with a network-registered self-address stored in said telephonic electronic message apparatus;
(b) providing a processing means for said telephonic electronic message apparatus for receiving said electronic messages and for storing said messages therein if said network address matches said network-registered self-address; and
(c) providing a collecting-message triggering means for triggering a connection of said telephonic apparatus to said network server for collecting said electronic messages designated with said network-registered self-address from said network server.

22. An electronic message communication system comprising:
a network server for sending and receiving electronic messages through a network system connected to a telephone line;
a telephonic electronic message apparatus connected to said telephone line includes an electronic message processing means for receiving said electronic messages from said network server or computers connected to said network system;
said telephonic electronic apparatus further include a registered self-address recognition means for comparing a network address contained in said electronic message with a network-registered self-address for receiving said electronic messages if said network address contained in said electronic messages matches said network-registered self-address whereby said electronic said telephonic electronic message apparatus is always ready to receive said electronic messages with a destination address identical to said registered self-network address without requiring a computer to first log on to said network server or dialing up another computer via said network system; and
a collecting-message triggering means for triggering a connection of said telephonic apparatus to said network server for collecting said electronic messages designated with said network-registered self-address from said network server.

23. The electronic message communication system of claim 22 wherein:
said telephonic electronic message apparatus includes an dialing means for dialing up and connecting to said network server and a registration means for sending a plurality of registration data includes said registered self-network address to said network server.

24. The electronic message communication system of claim 23 wherein:
said telephonic electronic message apparatus includes an automatic registration means for storing required registration data includes said registered self-network address therein and for automatically dialing and registrating with said network server for receiving said electronic messages therefrom.

25. The electronic message communication system of claim 23 wherein:
said telephonic electronic message apparatus further includes a registration actuation means includes a registration button for a user to push said registration button and actuate said dialing up and said registration means for registration of said telephonic electronic message apparatus identified by said network-registered self-address with said network server.

26. The electronic message communication system of claim 23 wherein:
said network server further includes a registration processing means for receiving and process said plurality of registration data includes said network-registered self-address of said telephonic electronic message apparatus for registration of said telephonic electronic message apparatus therein.

27. The electronic message communication system of claim 23 wherein:
said telephonic electronic message apparatus further includes an automatic logon means for automatically dialing and logging on a network server periodically using said network-registered self-address for receiving said electronic messages therefrom.

28. The electronic message communication system of claim 22 wherein:
said network server includes a message priority means for identifying a priority level for each of said electronic messages and for sending each electronic message to said telephonic electronic message apparatus according to said priority level.

29. The electronic message communication system of claim 28 wherein:
said telephonic electronic message apparatus includes a priority function keys for selecting values of priority levels in receiving said electronic messages assigned with said priority levels by said network server.

30. The electronic message communication system of claim 22 wherein:
said telephonic electronic message apparatus includes a storage capacity processing means for checking a storage capacity of said telephonic electronic message apparatus and for sending a storage capacity message to said network server whereby a message overflow of said telephonic electronic message apparatus may be prevented.

31. The electronic message communication system of claim 22 wherein:
said telephonic electronic message apparatus further includes a message sending means for sending said electronic messages therefrom.

32. An electronic message communication system comprising:
- a network server for sending electronic messages through a network system to a receiving apparatus wherein said receiving apparatus includes a registered self-address recognition means for comparing a network address with an extension of an E-mail address and a programmable code contained in said electronic messages for accepting said electronic messages; and
- said receiving apparatus includes a collecting-message triggering means for triggering a connection of said receiving apparatus to said network server for collecting said electronic messages, includes said network address, said extension of E-mail address, and said programmable code, from said network server.

33. An electronic message communication system comprising:
- a network server for sending electronic messages through a network system to a receiving apparatus wherein said receiving apparatus includes a registered self-address recognition means for comparing a network address and an address extension contained in said electronic messages for accepting said electronic messages; and
- said receiving apparatus further includes a collecting-message triggering means for triggering a connection of said receiving apparatus to said network server for collecting said electronic messages designated with said network-registered self-address from said network server.

34. The electronic message communication system of claim 33 wherein:
- said receiving apparatus includes a priority means for applying said address extension contained in said electronic messages for arranging a priority for receiving said electronic messages.

35. The electronic message communication system of claim 34 wherein:
- said priority means further checking a size of said electronic message for arranging a priority for receiving said electronic messages.

* * * * *